R. CROWDER.
METER.
APPLICATION FILED AUG. 4, 1917.
1,278,600.
Patented Sept. 10, 1918.
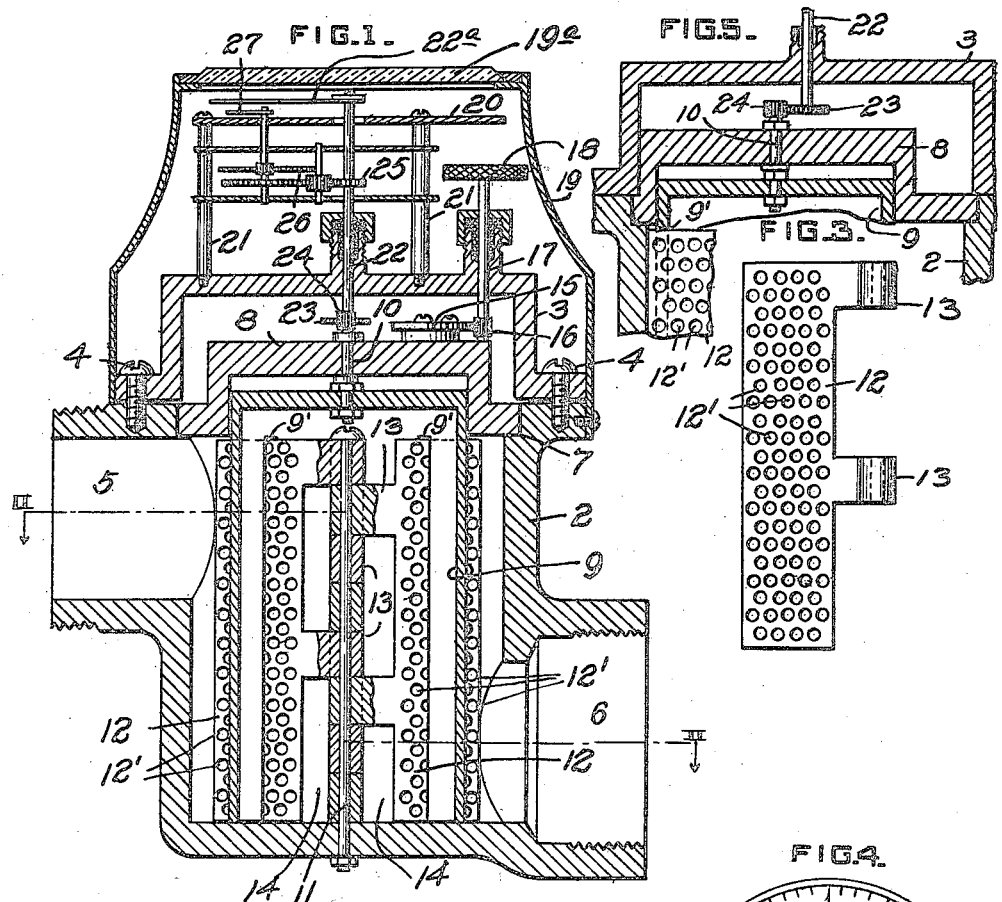
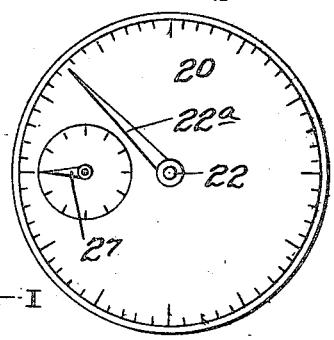
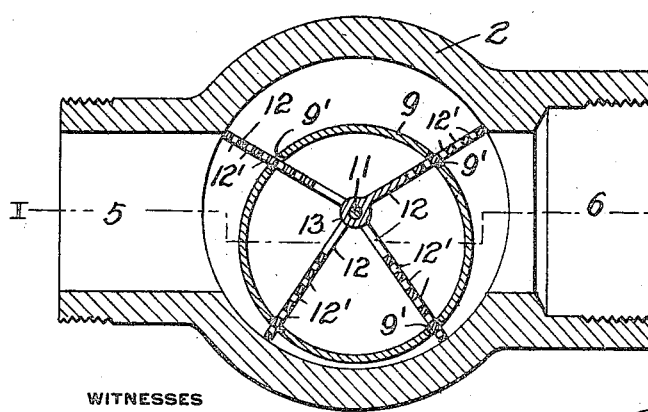
WITNESSES
INVENTOR

UNITED STATES PATENT OFFICE.

RAYMOND CROWDER, OF EDGEWOOD, PENNSYLVANIA.

METER.

1,278,600.

Specification of Letters Patent. Patented Sept. 10, 1918.

Application filed August 4, 1917. Serial No. 184,426.

*To all whom it may concern:*

Be it known that I, RAYMOND CROWDER, a citizen of the United States, residing at Edgewood, in the county of Allegheny and State of Pennsylvania, have invented a certain new and useful Improvement in Meters, of which the following is a specification.

My invention consists of an improvement in apparatus for measuring gasolene or other liquids and more particularly to a meter adapted to measure the quantity of liquid passing therethrough, and has for one of its objects to provide such a device that may be adjusted for measuring different liquids.

The improved device, comprised in the present application relates to a meter adapted to have the liquid to be measured passed therethrough, and to register by suitable registering mechanism the amount of liquid measured.

Other objects of my improved device are to produce a meter that will be simple, readily adjustable, and accurate.

One preferred form of my device is illustrated in the accompanying drawings, although it will be readily understood that various changes in detail construction and design may be made within the skill of the mechanic in the art, without departing from the spirit of my invention as defined in the accompanying claims.

In the drawings:

Figure 1 is a longitudinal sectional view of my meter, the plane of the section being centrally through the main case but offset as to the rotatable cup member and its cap, as indicated by the line I—I of Fig. 2;

Fig. 2 is a sectional view on the line II—II of Fig. 1;

Fig. 3 is a detail view of one of the vanes;

Fig. 4 is a plan view of the dial of the registering mechanism, and

Fig. 5 is a fragmentary sectional view taken at right angles to Fig. 1.

Referring more particularly to the drawings, 2 designates the casing or body of my device having a detachable head or covering 3 secured thereto by screws 4 or other suitable means. The casing 2 has an inlet opening 5 at one side adjacent its upper end and an outlet opening 6 at its opposite side adjacent its lower end, each of said openings projecting outward from the normal contour of the body portion and being suitably threaded for engagement with conveying pipes or other means. The upper edge of the casing 2 has a recess 7 extending around its inner periphery and a suitable cap or disk member 8 is revolubly mounted in said recess.

A cylindrical cup member 9 having its top portion closed is revolubly mounted within the body portion 2 on a pivot member 10 secured to the center of the closed end of the cup 9. The pivot member 10 is eccentrically journaled in the member 8, as clearly shown in Fig. 5.

Mounted centrally within the body portion 2 and extending upwardly from the bottom wall thereof is a shaft 11 on which is mounted a plurality of suitable vanes 12 having one-half of their surface cut away by a plurality of small apertures 12′ to allow passage of liquid therethrough. While I have shown and prefer to use four vanes it will be evident that any other number may be used. The vanes 12 each has one side cut away forming projecting lugs 13 adapted to be bent hinge-fashion around the shaft 11, and such lugs extend a sufficient distance from the main body portion of the vanes 12 so that when they are mounted on the shaft 11 there will be clearance spaces or openings 14 between the body portion of each vane and the shaft 11. The cylindrical member or cup 9 is slotted as at 9′ at equal distances around its periphery to permit the vanes 12 to loosely extend through said cup such a distance as to normally touch the inside walls of the casing 2.

The member 8 has mounted on its upper side a rack 15 adapted to be engaged by a suitable pinion 16 on a shaft 17 extending upwardly through the cover 3 and having a knurled knob 18 on its upper end. A suitable packing box may be formed on said cover 3 around the shaft 17 to prevent leakage. By rotation of the shaft 17 the member 8 will be rotated consequently changing the location of the pivot 10 about the center of the main casing 2 according to the direction in which said shaft is rotated, thereby changing the area of the vanes 12 without the cup 9 to present a greater or less frictional surface. It will be understood, as shown in the drawings, that the cylindrical member or cup 9 is of smaller diameter than the body portion 2 and, therefore, may be rotated to various eccentric positions therein.

It is preferred in order to have a free but still restricted flow of the liquid through my totalizer that the exposed area of each of the vanes 12 protruding the farthest through the cup 9 is equal to the inlet or outlet openings 5 and 6, respectively, and since one-half of this area is cut away the free passage for the liquids through the vanes will be equal to one-half the inlet or outlet openings.

The cup member 9 is adapted to have a floating action within the body portion 2 by reason of the slots 9' extending from the lower end upwardly to within a short distance of the upper closed end, thereby leaving the closed portion adapted to hold air to cause a buoyant action of such member.

The registering and indicating portion of my device comprises a casing 19 closed at its top portion by a suitable glass disk member 19$^a$. A suitable dial 20 having indicia thereon is mounted on supports 21 secured in the member 3. A main shaft member 22 is journaled in the member 3 and has a gear 23 on its lower end meshing with the pinion gear 24 on the pivot 10 of the cup 9. A suitable hand 22$^a$ is secured to the upper end of the shaft 22 and is adapted to extend over the indicia around the dial. A gear 25 is mounted on the shaft 22 between the member 3 and the dial and is adapted to mesh with other suitable gearing 26 adapted to revolve a registering hand 27 somewhat smaller than the main hand. Separate indicia are provided on the dial 20 around which the hand 27 is adapted to rotate.

It will be understood, however, that my registering device may be of any suitable construction of which many well known forms are at present in use.

The operation of my device is as follows— Liquid entering the inlet 5 will flow against the vanes 12 and through the several apertures in the vanes but with sufficient resistance to rotate the cup 9 and thereby operate the main shaft member 22 by reason of its being geared with the pivot 10 and thus register the amount of liquid on the dial.

To adjust my device, so that it will correctly measure heavy or light liquids or to adjust it to the pressure of flow of the liquids, the cup 9, which is eccentrically mounted, is revolved about the center of the device by turning the shaft 17 through the knurled knob 18, thereby increasing or decreasing the area of the vanes 12.

It will be noted that by mounting the cup 9 eccentrically two of the vanes 12 will project a greater distance through the slots 9' than the other two and the friction of the liquid against the two vanes extending the farthest through the cup 9 will cause a rotation of the cup in that direction.

Having thus fully described my invention, what I claim is:

1. A meter for liquids, comprising a body portion, a cup member rotatably mounted therein, a plurality of apertured vanes within said cup member and extending therethrough, and registering mechanism adapted to be operated by said cup member.

2. A meter for liquids, comprising a body portion having inlet and outlet openings, a cup member rotatably mounted therein, a plurality of vanes within said cup member and extending therethrough, said vanes having approximately one-half of their surface cut away, said cup member being adapted to be rotated by the flow of liquid against said vanes, and registering mechanism adapted to be operated by the rotation of said cup member.

3. A meter for liquids, comprising a chambered body portion, a cup member rotatably mounted therein, a plurality of vanes operatively engaging said cup member and extending therebeyond and having openings therein to permit the free passage of a portion of the liquid therethrough, and means for registering the amount of liquid passing through said meter.

4. A meter for liquids, comprising a body portion having inlet and outlet openings, a disk member rotatably mounted within said body portion, a cup member eccentrically pivoted to said disk member, a plurality of vanes within said cup member and extending therethrough, and registering mechanism adapted to be operated by said cup member.

5. A meter for liquids, comprising a body portion having inlet and outlet openings, a cup member eccentrically pivoted within said body portion, means for adjusting the eccentric position of said cup member, a plurality of apertured vanes hingedly secured to a shaft extending within said cup member and centrally mounted with respect to said body portion, said vanes extending through slots in said cup member, and registering mechanism adapted to be operated by said cup member.

6. A meter for liquids, comprising a body portion having inlet and outlet openings, a cup member eccentrically pivoted within said body portion, a plurality of vanes hingedly secured to a shaft extending within said cup member and centrally mounted with respect to said body portion, said vanes extending through slots in said cup member, means for adjusting the eccentric position of said cup member, and registering mechanism adapted to be operated by said cup member.

7. A device of the class described comprising a body portion having inlet and outlet openings, a disk member revolubly mounted on said body portion, a cup member having slots therein eccentrically pivoted to said disk member, a shaft centrally arranged within said body portion and extending within said cup member, a plurality of vanes hingedly secured on said shaft and extending through said slots in said cup member, said cup being adapted to be rotated by the flow of liquid against said vanes, and means connected with said cup for registering the amount of liquid passing through the device.

8. A device of the class described comprising a body portion having inlet and outlet openings therein, a disk member revolubly mounted on said body portion, a cup member having slots therein eccentrically pivoted to said disk member, a shaft centrally arranged within said body portion and extending within said cup member, a plurality of apertured vanes hingedly secured on said shaft and extending through said slots in said cup member, said cup member being adapted to be rotated by the flow of liquid against said vanes, means for revolving said disk member to adjust the eccentric position of said cup around center, and means connected with said cup for registering the amount of liquid passing through the device.

In testimony whereof I hereunto affix my signature.

RAYMOND CROWDER.